United States Patent [19]
Cogswell, II et al.

[11] Patent Number: 5,112,114
[45] Date of Patent: * May 12, 1992

[54] ANTI-SPIN HYDRAULIC BRAKE SYSTEM

[75] Inventors: James A. Cogswell, II, Clarkston; James L. Coulter, Mt. Clemens, both of Mich.

[73] Assignee: General Motors Corporation, Detroit, Mich.

[*] Notice: The portion of the term of this patent subsequent to Dec. 11, 2007 has been disclaimed.

[21] Appl. No.: 509,641

[22] Filed: Apr. 12, 1990

[51] Int. Cl.⁵ .............................. B60T 13/08
[52] U.S. Cl. ................ 303/113 TR; 303/115 PP; 303/117
[58] Field of Search ............... 180/197; 303/110, 61, 303/62, 113, 115 PP, 116 SP, 113 TR, 117

[56] References Cited

U.S. PATENT DOCUMENTS

| | | | |
|---|---|---|---|
| 3,836,208 | 9/1974 | Wienecke | 303/115 PP |
| 3,963,277 | 6/1976 | Chiba | 303/61 X |
| 3,993,365 | 11/1976 | Kondo | 303/115 PP |
| 4,575,161 | 3/1986 | Vanzant et al. | 303/110 |
| 4,655,509 | 4/1987 | Ando et al. | 303/115 PP |
| 4,700,991 | 10/1987 | Nishimura et al. | 303/115 PP |
| 4,741,581 | 5/1988 | Krohn | 180/197 X |
| 4,765,691 | 8/1988 | Inoue et al. | 303/119 X |
| 4,768,843 | 9/1988 | Baughman et al. | 180/197 X |
| 4,796,959 | 1/1989 | Seibert et al. | 180/197 X |
| 4,938,543 | 7/1990 | Parker et al. | 180/197 X |

FOREIGN PATENT DOCUMENTS 0194657 11/1983 Japan .............................. 303/115 PP Primary Examiner—Matthew C. Graham
Assistant Examiner—Peter M. Poon
Attorney, Agent, or Firm—Ernest E. Helms

[57] ABSTRACT

The present invention provides an apparatus and method of utilization thereof of a traction control system for automotive vehicles. The inventive traction control system provides selective hydraulically actuated braking to the drive wheel which is spinning to restrain rotation thereof so that torque to that respective wheel may be increased.

4 Claims, 2 Drawing Sheets

ANTI-SPIN HYDRAULIC BRAKE SYSTEM

This is a continuation-in-part of copending U.S. Ser. No. 223,327 filed July 25, 1988, now U.S. Pat. No. 4,976,500.

FIELD OF THE PRESENT INVENTION

The field of the present invention is that of traction control systems. More particularly, the present invention provides an apparatus and method of utilization of the same to control wheel "spinning" due to high vehicle acceleration or driving on surfaces with exceptionally low coefficients of friction.

DISCLOSURE STATEMENT

To maximize the traction of a vehicle drive wheel it is sometimes necessary to retard the speed of the vehicle wheel to keep the wheel from spinning. Wheel spinning can often occur when a vehicle accelerates on an icy surface or when the vehicle undergoes high acceleration.

Prior to the present invention the major method to prevent vehicle wheel spin was some type of engine control. One method to retard engine torque output is to reduce the number of active cylinders in the engine. Another method was to cut off fuel to the engine or to retard engine spark timing. Both of the above methods were disadvantageous in that the inertia of the drive train was still quite high. Therefore torque levels of the drive wheels remain higher longer than desired, even though the engine may have slowed down. Still another disadvantage is that modulating the engine timing or fuel supply often cause the engine to operate in a rough manner.

Still another disadvantage of relying upon engine control to retard vehicle wheel spin is that occasionally, especially on icy surfaces, two wheels on a common differential can have radically divergent wheel rotational speeds, therefore retarding the engine does not necessarily mean that the wheel whose rotational speed needs to be lowered will be so in comparison with the other wheel on the common differential. Furthermore, retardation of the engine lowers the maximum torque available to the drive wheel which is not spinning.

To provide a better traction control system it is preferable to selectively brake the vehicle wheel which is spinning. Such a system as described above must provide a fast response causing activation of the brakes as soon as practically possible after the occurrence of a condition which causes wheel spin. Secondly, it would be advantageous to provide a traction system which can not only apply braking to a spinning drive wheel but can also modulate the application of the braking to the wheel. Furthermore, such a system should provide a brake override allowing the vehicle operator to hydraulically override the traction control system by activating the brake pedal. Additionally, it would be preferable that the traction control system be able to be used with or without an anti-lock or anti-skid braking system (ABS). It would also be advantageous that a traction control system rely upon hydraulic components as much as possible to minimize the required electrical or electronic components. Lastly it would be advantageous that such a traction control system could be used advantageously on two wheel or four wheel drive vehicles as well as larger vehicles, such as class 8 trucks.

SUMMARY OF THE INVENTION

To meet the above-noted and other desires the present invention is brought forth. The present invention provides a traction control system which can selectively brake a wheel which is in a spinning condition. Additionally, the present invention provides a traction control system which can be overridden by the operator activation of the brakes.

It is a desire of the present invention to provide a traction control system and a method of utilization thereof.

It is an object of the present invention to provide a traction control system for a vehicle having a plurality of powered wheels, with at least two of the wheels having fluid actuated brakes, the system also having a master cylinder responsive to the command of a vehicle operator to supply fluid to the wheel brakes, the traction control system including a first mechanical hydraulic system for selectively supplying pressurized brake fluid to a respective wheel brake or withdrawing brake fluid from respective wheel brake independent the master cylinder, sensing means to determine the rotational displacement of the respective wheel and means to compare the wheel rotational displacement with the displacement of the vehicle and to generate a signal in response thereto, a first control valve means normally closed allowing communication between the first mechanical hydraulic system and the wheel brake in response to the signal from the sensing means, isolating valve means, normally opened allowing fluid communication between the respective wheel brake and the master cylinder to allow operator actuation of the wheel brake, the isolating valve means in a closed position preventing fluid communication between the wheel brake and the master cylinder when the first mechanical hydraulic system is in communication with the wheel brake, means to hydraulically latch the isolation valve means to the closed position when the first mechanical hydraulic system is supplying or withdrawing brake fluid from the brake cylinder, hydraulically-actuated means to override the first control valve means to return the isolating valve means to the open position whereby the operator can again control the wheel brakes.

It is also an object of the present invention to provide a traction control system for a vehicle having a plurality of powered wheels with at least two of the wheels having a fluid actuated brakes, the system also having master cylinder responsive to the command of a vehicle operator to supply fluid to the wheel brakes, the master cylinder having a powered booster, the system including a sump for storing a hydraulic control fluid, an accumulator for storing the control fluid under pressure, a pump for transferring the control fluid from the sump to said accumulator, a piston body housing fluidly connected with the accumulator and to the master cylinder booster, the piston body housing having a piston slidably mounted therein for selectively supplying presurized brake fluid to or withdrawing fluid from a respective wheel brake independent of the master cylinder, a sensor/computer to determine the rotational displacement of the wheels and to compare said wheel rotational displacement with the displacement of the vehicle and to generate a signal in response thereto, a first solenoid control valve normally closed allowing selective fluid communication between the accumulator and the piston body housing in response to a signal of the sensor/computer, a second solenoid control valve normally open allowing selective fluid communication between said piston body housing and the control fluid sump in response to a signal of the sensor/computer, a normally open shuttle isolation valve slidably mounted within the piston body housing allowing fluid communication between the respective wheel brake and the master cylinder and preventing fluid communication between the master cylinder and the wheel brake when the first solenoid valve is in an open position or when the second solenoid valve is closed, means to hydraulically latch the shuttle isolation valve in a closed position when the first solenoid valve is open or when the second solenoid is closed, means to hydraulically open the shuttle isolation valve allowing the master cylinder to communicate with the wheel brake by virtue of pressure provided by the brake cylinder booster on the shuttle isolation valve whereby the vehicle operator can again control the operation of the vehicle brake regardless of the opening of the first solenoid valve or the closing of the second solenoid valve.

It is yet another object of the present invention to provide a method to prevent wheel spinning in a motor vehicle having at least two powered wheels with fluid actuated brakes and a master cylinder responsive to the command of a vehicle operator, the system including selectively supplying or withdrawing brake fluid from a respective wheel brake independent of the master cylinder, sensing the rotational displacement of a respective powered vehicle wheel and comparing the speed with the displacement of the vehicle and generating a signal in response thereto, selectively controlling in response to the sensor signal supplying or withdrawing of brake fluid to the wheel brake independently of the master cylinder, isolating the wheel brake from the master cylinder when there is brake fluid being supplied to or withdrawn from the wheel brake independently of the master cylinder, hydraulically latching the isolating of the wheel brake from the master cylinder, and hydraulically overriding the supplying or withdrawing of brake fluid to the brake cylinder independent of the master cylinder and opening the communication between the master cylinder and the wheel brake whereby the operator can again control the operator of the wheel brakes.

Further objects, desires and advantages of the present invention can become more apparent to those skilled in the art as the nature of the invention is better understood from the accompanying drawings and a detailed description.

DETAILED DESCRIPTION OF THE DRAWINGS

Figure 1:
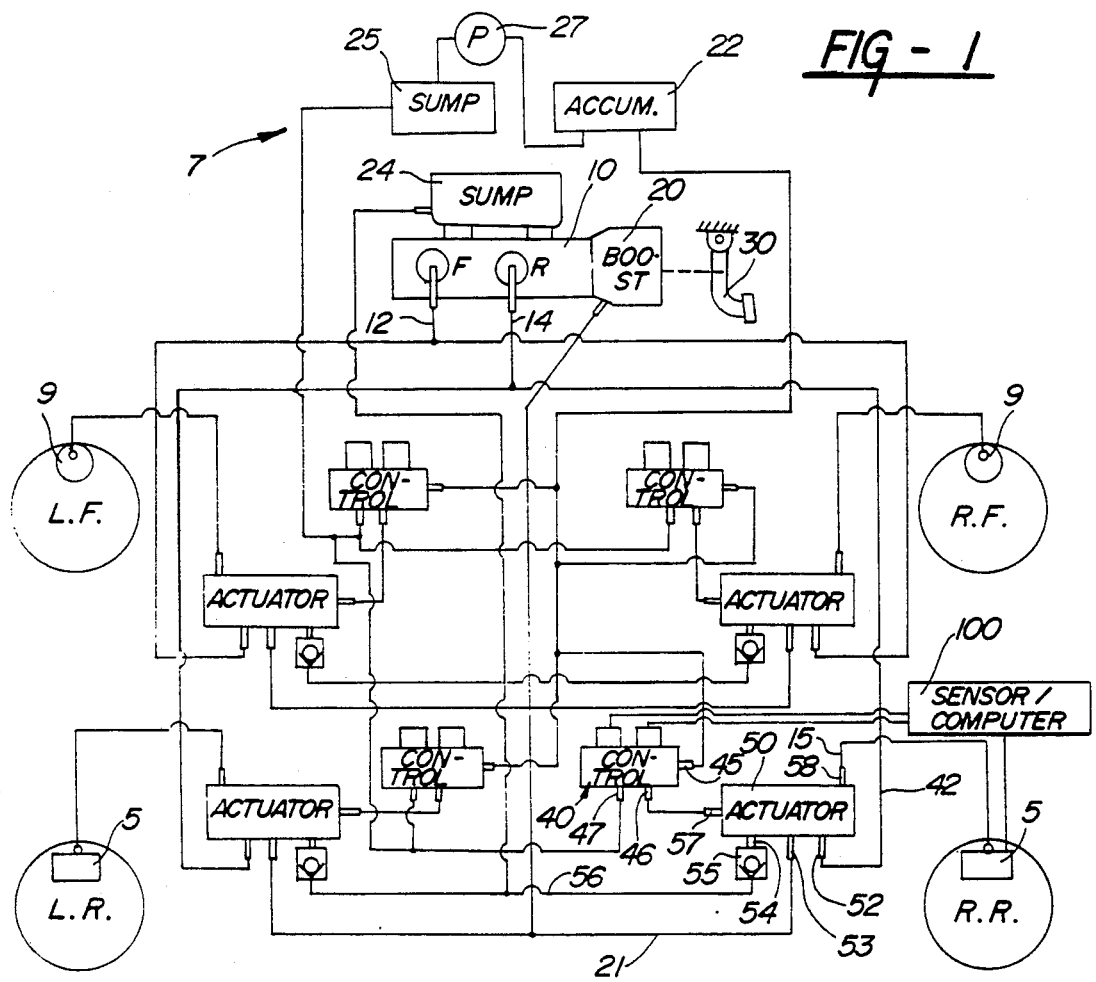
FIG. 1 is a schematic of the braking system of the present invention in the environment of a four wheel drive vehicle with front disc and rear drum brakes.
Figure 2:
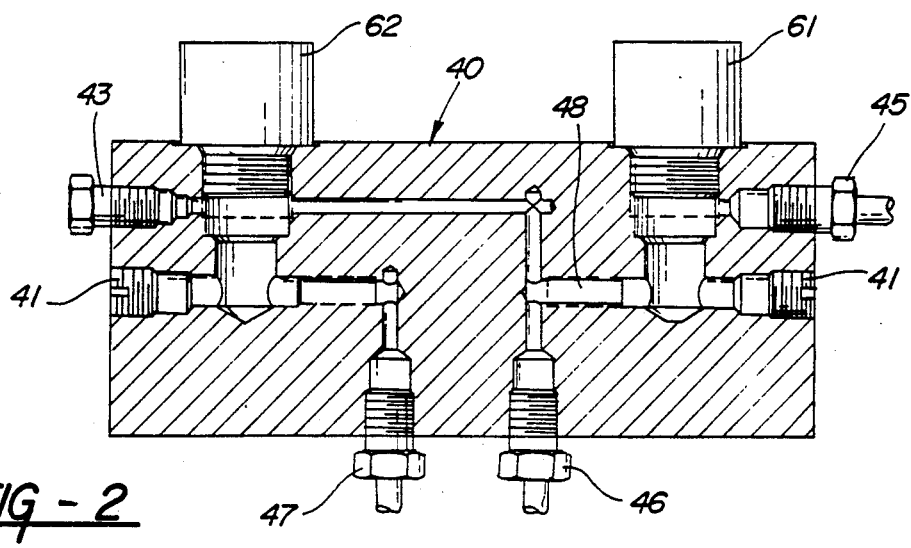
FIG. 2 is a sectional view of a control valve body.
Figure 3:
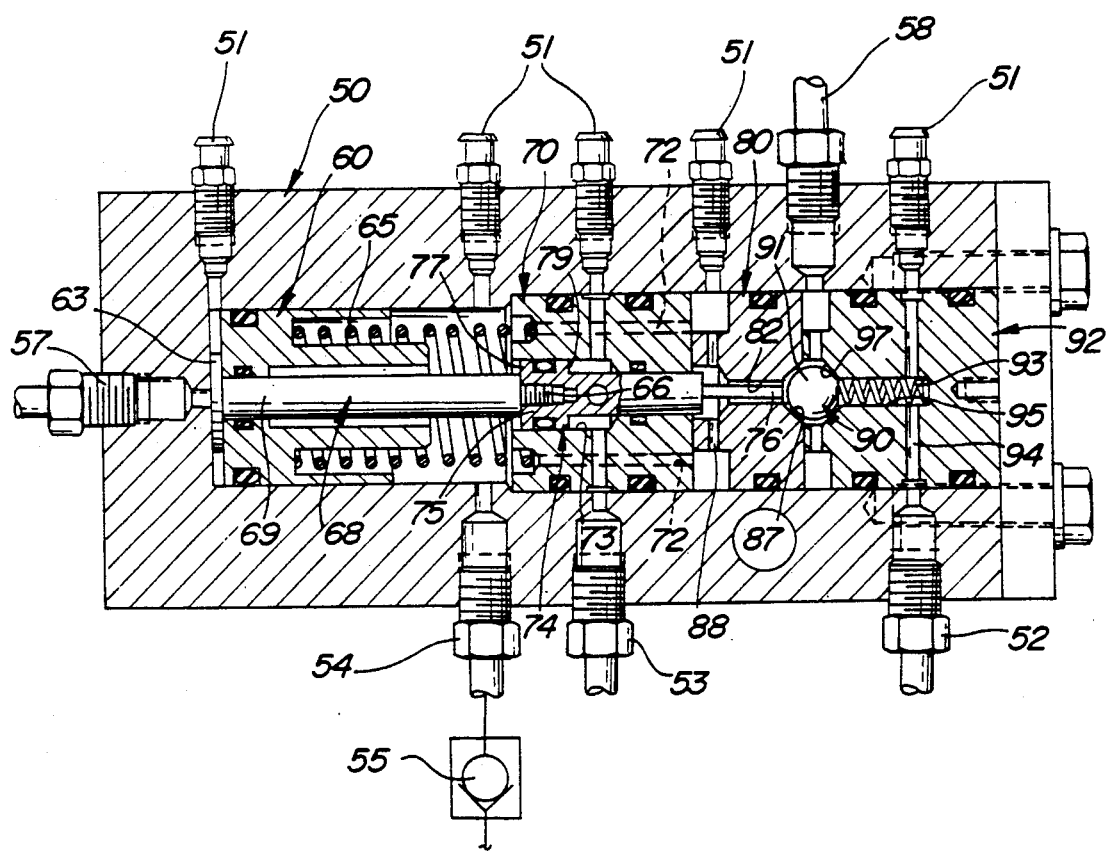
FIG. 3 is a sectional view of a piston valve body.

Referring to FIGS. 1, 2 and 3, the vehicle traction control system 7 has a double circuit master cylinder 10. One master cylinder circuit 12 is utilized for the front brake cylinders 9 and the other master cylinder circuit 14 is utilized for the rear brake cylinders 5. An optional hydraulic booster 20 is provided to reduce the pedal 30 effort of the operator to actuate the brakes. Additionally, connected with the system 7 is a brake fluid sump or reservoir 24 for returning brake fluid to the master cylinder 10.

A control system fluid sump 25 is fluidly connected with a traction control pump 27 which feeds accumulator 22. Typically the hydraulic control fluid has a higher viscosity than the brake fluid. However, if desired, the same fluid can be used for the control fluid and the brake fluid. And of course a common sump can be provided. The hydraulic accumulator 22 is fluidly connected to a respective first control valve 40 means or block for each hydraulic brake of the vehicle which is part of the traction control system 7.

The control valve block 40 (FIG. 2) has two plugged outlets 41 and a bleeding port 43. The control valve block 40 also has an accumulator inlet 45 and two additional fluid connections 46 and 47. Controlling the valving of pressurized fluid through the accumulator inlet 45 is a first solenoid control valve 61. A normally open second solenoid control valve 62 fluidly controls access between the first control valve block 40 and the control fluid sump 25 via connection 47. When the first solenoid 61 is open and the second solenoid 62 is closed, pressurized control fluid flows from the accumulator 22 to the displacement connection 46 via the first control block 40. If desired, an orifice 48 can be inserted within the first control valve block 40 to limit the flow rate. To shut off flow from the accumulator 22 the normally closed first solenoid 61 returns to its closed position. To provide fluid communication between the connection 46 and the sump 25, the second solenoid 62 is placed in an open position while solenoid 61 remains closed. Both solenoids 61 and 62 are isolated from the wheel brake cylinder 5.

Referring in more detail to FIG. 3, excepting the bleed lines 51, the actuator or piston body housing 50 has five fluid connections. As shown piston body housing 50 is for one separate wheel, however, if desired, it can be sized to handle a plurality of powered wheels. At the right end, as shown in FIG. 3 at the bottom, is a connection 52 which fluidly communicates with the master cylinder circuit 14 via line 42. Towards the middle portion of the piston body housing 50 is a connection 53 which fluidly communicates with a line 21 (FIG. 1) which is in turn connected with booster 20 of the master cylinder 10. Next to the booster connection 53 is a connection 54. Connection 54 fluidly communicates with the sump 24 via line 56 (FIG. 1) and a check valve 55 to allow brake fluid flow into the piston body housing 50 while preventing brake fluid flow from the piston body housing 50 towards the brake fluid sump 24. At the far left is a displacement connection 57 which is fluidly connected with the displacement connection 46 of the control valve block 40.

Slidably and sealably mounted within the piston body housing 50 is a displacement piston 60 spring biased towards the connection 57. The piston 60 is slidably and sealably mounted on a shuttle valve extension 68. The spring 65 which biases the piston 60 towards the connection 57 contacts a shuttle valve housing 70.

The shuttle valve extension 68 has a stem 69 with a head 63. The shuttle valve housing 70 has a series of axial passages 72 generally aligned with the bore of the piston body housing 50. The shuttle valve housing 70 also has an inner bore 73 with a slidably sealably mounted shuttle valve 74. The shuttle valve 74 has a head 75 for reception of a stud 66 of the shuttle valve extension 68. Additionally, the shuttle valve 74 has a reduced diameter section 76 which is non-sealably slidably mounted within an axial bore 82 of an intermediate housing 80 which is adjacent to the shuttle valve housing 70. The reduced diameter 76 of the shuttle valve is adjacent to a ball valve member 91 of the ball check valve 90. The ball 91 is spring biased towards the shuttle valve and normally allows fluid communication between the master cylinder via connection 52 and the respective wheel cylinder via a connection 58 and line 15 (FIG. 1). The valve 90 is provided with a housing 92 which mounts the spring 93 which biases the ball 91 away from closing off the passages 94 and 95 between the wheel cylinder 5 and the master cylinder 10. In the absence of any control fluid pressure to the left of piston 60, the check spring 93 of the valve 90 will place the ball 91 on opposite ball seat 87, away from closing off the passages 94 and 95 between the wheel cylinder 5 and the master cylinder 10.

The pump 27, control accumulator 22, in cooperation with piston 60 provide a mechanical closed hydraulic system for selectively supplying pressurized brake fluid to the wheel brakes or withdrawing brake fluid from the wheel brakes independent of the master cylinder. Check valve 90 in cooperation with the shuttle valve 74 provides a normally open isolation valve means to allow fluid communication between the master cylinder 10 and brake cylinder 5 to allow operator actuation of the brakes. The isolation valve means when closed prevents fluid communication between the brake 5 and master cylinder 7. The isolation valve means will be closed whenever the mechanical hydraulic system is communicating with the brake cylinder 5 as will be later explained.

Control valve block 40 in cooperation with solenoids 61 and 62 provide a first control valve means allowing fluid communication between the mechanical hydraulic system and the wheel brake in response to a signal from a sensor/computer 100 (FIG. 1).

In normal operation (non activation of the traction control system 7) the first solenoid valve 61 will be closed thereby preventing any control fluid flow between the accumulator 22 and the displacement connection 46, or to the sump 25. The displacement connection 57 (FIG. 3) will be fluidly connected with the control fluid sump 25 via the control block 40 since the second solenoid 62 is normally open. The spring 93 of the valve 90 will bias the ball 91 against the opposing seat 87.

When the vehicle operator activates the brake pedal 30, brake fluid from the master cylinder 10 (via circuit 14, line 42 and connection 52 passes through the passages 94 and 95 towards the ball 91. The brake fluid then exits to the wheel cylinder 5 via connection 58. The wheel cylinder 5 is connected with a wheel shoe of the drum brake.

When one of the vehicle's wheels starts to spin a sensor/computer means 100 compares the rotational speed of the wheel with the speed of the vehicle. The sensor/computer 100 provides a signal to brake the wheel so that maximum traction can be developed from that wheel. (Note: the above may be made by a comparison of rotational displacement or a derivative thereof with vehicle displacement or a derivative thereof or some type of wheel rotational displacement comparison with an average value. The word displacement as used in this application extends to the sensing of derivatives.) The above signal causes the first solenoid 61 for the respective spinning wheel to open allowing pressurized fluid control from the accumulator 22 to exit out the displacement connection 46 of the control valve block 0. Simultaneously, or before the above action of solenoid 61 the second solenoid 62 will close preventing the displacement connection 46 from being exposed to the control fluid sump 24. Thereafter control fluid will flow out into the displacement connection 57 of the piston body housing 50 causing the piston 60 to compress the spring 65 moving to the right. The influx of pressurized control fluid through connection 57 will also cause the shuttle valve extension 68 to also move to the right thereby causing the shuttle valve 74 to move to the right. The shuttle valve 74 will push the ball 91 off the seat 87 causing the ball 91 to nest on a seat 97. Thereafter brake fluid communication between the master cylinder 10 and the brake cylinder 5 will be cut off. Cutting off fluid communication between the master 10 and wheel 5 cylinders is necessary to prevent any possible communication with the brake fluid sump 24 (via the master cylinder 10).

Fluid communication now is between the right side of the piston 60 flowing through the axial passages 72 in the shuttle valve housing 70 through radial openings 88 of the intermediate housing 80 and around the smaller portion 76 of the shuttle valve 74 to the respective wheel cylinder 5. The control and modulation of the application of the brake cylinder 5 is accomplished by synchronization of selective opening and closing of the first solenoid 61 along with a selective opening and closing of the normally open second solenoid 62. The above switching controls the pressure which is applied to the respective brake cylinder via movement of piston 60 on the stem 69 of the shuttle valve extension 68. Pressure modulation is usually desirable since typically the brake cylinder is initially fully applied to achieve wheel speed reduction. Then after in response to the signal from the sensor/computer 100 the brake cylinder pressure is modulated keeping the wheel from stopping.

When the shuttle valve small diameter portion 76 moves to the right moving the ball 91 against the seat 97, the shuttle valve 74 will remain fixed against the ball 91 regardless of the pressure modulation provided by movement of piston 60. The pressure on the right side of piston 60 multiplied by the area of the left side 77 of the shuttle valve head 75 will always be greater (provided that the vehicle operator is not operating the brakes) than the pressure within bore 73 multiplied by the area of the right side 79 of the shuttle valve head 75 (Note: the area 79 will usually be sized to be smaller than the area 77). The above provides the means to hydraulically latch the isolation valve means to a closed position in a noncompliant manner when the mechanical hydraulic system is supplying or withdrawing brake fluid from the brake cylinder 5.

It is desirable that the system 7 operate such that any operator actuation of the brake pedal 30 will override the traction control system 7. When the vehicle operator activates the pedal 30 the pressure in the brake booster 20 increases. The pressurized brake fluid from the brake booster 70 enters the piston housing 50 body through connection 53 via line 21 and causes the shuttle valve 74 to move to the left when the booster pressure is greater than the pressure on the right side of piston 60. Moving the shuttle valve 74 leftward allows the spring 93 to push the ball 91 of the valve 90 on its opposite seat 87 cutting off any fluid flow from the right side of the piston 60 to the brake cylinder when the pressure in passages 94 and 95 equal the pressure in axial bore 82. The above assures a smooth transition of pressure delivered to brake cylinder 5. Fluid communication is again restored between the master cylinder 10 and the wheel cylinder 5. Simultaneously, actuation of the brake pedal 30 will cause the first solenoid 61 to close and the second solenoid 62 to open thereby connecting the displacement connections 46 and 57 with the control fluid sump 25. Therefore the piston 60 will move leftward with the assistance of the spring 65. Leftward movement of the piston 60 will contact head 63 to further urge the shuttle valve extension 68 in a leftward position and normal operation of the wheel brakes can again occur.

If desired, connection 53 could be connected with line 42 to the master cylinder. However, booster 20 pressure is usually available in less time after movement of pedal 30 than master cylinder pressure.

If the vehicle operator does not activate the brakes, the system sensor/computer 100 will signal the first solenoid 61 to return to the normally closed position and for the second solenoid 62 to return to the normally open position to deactivate the traction system 7 when the slip condition has been eliminated.

An advantage of the present inventive traction control system 7 is that an anti-lock braking system (ABS) can be added to the present system if desired.

Check valve 55 is provided to allow "makeup" brake fluid to reenter the control block housing 50 after piston 60 has moved leftward, check valve 55 could optionally be branched off to line 42 depending on the design of the master cylinder.

The present system 7 also provides optionally a hydraulic lock parking brake by simply activating the first solenoid 61 and closing the second solenoid 62 thereby locking the wheel cylinder 5. If desired, additional electronics can be provided such that the first 61 and second 62 solenoids will latch to open and closed respective positions. Therefore the hydraulic parking brake will not require a continuous use of current to connect the accumulator 22 with the wheel cylinder 5. Also second solenoid 62 if specified to be normally closed, could provide a parking lock function and be acceptable with traction control.

Another embodiment, not shown, provides a piston with multiple outside diameters mounted in a piston valve housing with multi-diametered bore. The above allow a multiplier affect (either positive or negative as desired) to relate the control fluid pressure to the desired brake cylinder pressure under traction control.

The present invention provides a method to prevent wheel spinning in a motor vehicle having at least two powered wheels with fluid actuated brakes 5 and a master cylinder 10 responsive to the command of a vehicle operator, said system including the steps of:

1. Selectively supplying or withdrawing brake 60 fluid from a respective wheel brake 5 independent of the master cylinder 10;
2. Sensing 100 the rotational displacement of a respective powered vehicle wheel and comparing the speed with the displacement of the vehicle and generating a signal in response thereto;
3. Selectively controlling 40 in response to the sensor signal the supplying or withdrawing of brake fluid 60 to the wheel brake 5 independently of the master cylinder 10;
4. Isolating 74,90 the wheel brake 5 from said master cylinder 10 when said there is brake fluid being supplied to or withdrawn 60 from the wheel brake 5 independently of the master cylinder 10;
5. Hydraulically latching the isolating of the wheel brake 5 from the master cylinder 10; and
6. Hydraulically overriding the supplying or withdrawing of brake 60 fluid to the wheel brake 5 independently of the master cylinder 10 and reopening the communication between the master cylinder 10 and the wheel brake 5 whereby the operator can again control the operation of the wheel brake 5.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A traction control system for a vehicle having a plurality of powered wheels, with at least two of said wheels having fluid actuated brakes, said system also having a master cylinder responsive to the command of a vehicle operator to supply brake fluid of a first viscosity to said wheel brakes, said traction control system in combination comprising:

a first mechanical closed hydraulic system for selectively supplying pressurized brake fluid to a respective wheel brake or withdrawing brake fluid from said respective wheel brake independent of said master cylinder, said first mechanical closed hydraulic system including a displacement piston slidably mounted within a piston body housing;

sensing means to determine the rotational displacement of said respective wheel and means to compare said wheel rotational displacement with the displacement of said vehicle and to generate a signal in response thereof;

a first control valve means fluidly connected with said piston body housing, said first control valve means governing fluid communication of a hydraulic control fluid of a second viscosity differing from said first viscosity to said piston body housing, said hydraulic control fluid being fluidly separated from said brake fluid by said displacement piston, said first control valve means being fluidly isolated from said wheel brake and said first control valve means being normally closed, said first control valve providing for modulated fluid communication between said first mechanical hydraulic system and said wheel brake in response to said signal from said sensing means;

isolating valve means, normally opened allowing fluid communication between said respective wheel brake and said master cylinder to allow operator actuation of said wheel brake, said isolating valve means in a closed position preventing fluid communication between said wheel brake and said master cylinder when said first mechanical hydraulic system is in communication with said wheel brake;

hydraulic means to latch said isolation valve means to said closed position when said first mechanical hydraulic system is supplying or withdrawing brake fluid from said brake cylinder; and hydraulically-actuated means to override said first control valve means to return said isolating valve means to said open position whereby said operator can again control said wheel brakes.

2. A traction control system as described in claim 1 wherein said isolating valve means is contained within said piston body housing.

3. A traction control system as described in claim 1 wherein said master cylinder has a booster and said booster supplies pressure to cause said isolating valve means to return to said open position to override said first control valve means.

4. A traction control system as described in claim 1 wherein said piston body housing has a connection for makeup of brake fluid when said first control valve means returns to said closed position.

* * * * *